D. W. CUSTER.
AUTOMATIC MULTIPLEX PRESS.
APPLICATION FILED AUG. 23, 1906.

927,123.

Patented July 6, 1909.
9 SHEETS—SHEET 1.

Fig. 1.

WITNESSES
E. Nottingham
G. F. Downing.

INVENTOR
D. W. Custer
By H. G. Seymour
Attorney

D. W. CUSTER.
AUTOMATIC MULTIPLEX PRESS.
APPLICATION FILED AUG. 23, 1906.

927,123.

Patented July 6, 1909.
9 SHEETS—SHEET 2.

D. W. CUSTER.
AUTOMATIC MULTIPLEX PRESS.
APPLICATION FILED AUG. 23, 1906.

927,123.

Patented July 6, 1909.
9 SHEETS—SHEET 6.

WITNESSES

INVENTOR

D. W. CUSTER.
AUTOMATIC MULTIPLEX PRESS.
APPLICATION FILED AUG. 23, 1906.

927,123.

Patented July 6, 1909.
9 SHEETS—SHEET 7.

WITNESSES
E. D. Nottingham
G. F. Downing

INVENTOR
D. W. Custer
By H. A. Seymour
Attorney

D. W. CUSTER.
AUTOMATIC MULTIPLEX PRESS.
APPLICATION FILED AUG. 23, 1906.

927,123.

Patented July 6, 1909.
9 SHEETS—SHEET 9.

WITNESSES
E. Nottingham
G. F. Downing

INVENTOR
D. W. Custer
By H. A. Seymour
Attorney

UNITED STATES PATENT OFFICE.

DWIGHT W. CUSTER, OF BROOKLYN, NEW YORK, ASSIGNOR TO CUSTER PRINTING PRESS COMPANY, OF NEW YORK, N. Y.

AUTOMATIC MULTIPLEX PRESS.

No. 927,123.     Specification of Letters Patent.     Patented July 6, 1909.

Application filed August 23, 1906. Serial No. 331,809.

*To all whom it may concern:*

Be it known that I, DWIGHT W. CUSTER, a resident of Brooklyn, in the county of Kings and State of New York, have invented certain new and useful Improvements in Automatic Multiplex Presses; and I do hereby declare the following to be a full, clear, and exact description of the invention, such as will enable others skilled in the art to which it appertains to make and use the same.

My invention relates to an improved automatic multiplex press, an object of the invention being to provide improvements of this character which are adapted to almost every character of ruling and printing, which economizes labor, power and floor space.

A further object is to provide a machine which feeds from a roll of paper, trims the edges smooth and straight, rules the paper on one or both sides in one or more colors, longitudinally and laterally, which prints on one or both sides in one or more colors, which perforates as desired, and which cuts the strip into sheets of the desired size, and which will perform any one or more of these operations without the others.

With these and other objects in view, the invention consists in certain novel features of construction and combinations and arrangements of parts as will be more fully hereinafter described and pointed out in the claim.

In the accompanying drawings, Fig. 3 is an enlarged view illustrating the inking mechanism for the printing and ruling cylinders.

Figure 1:
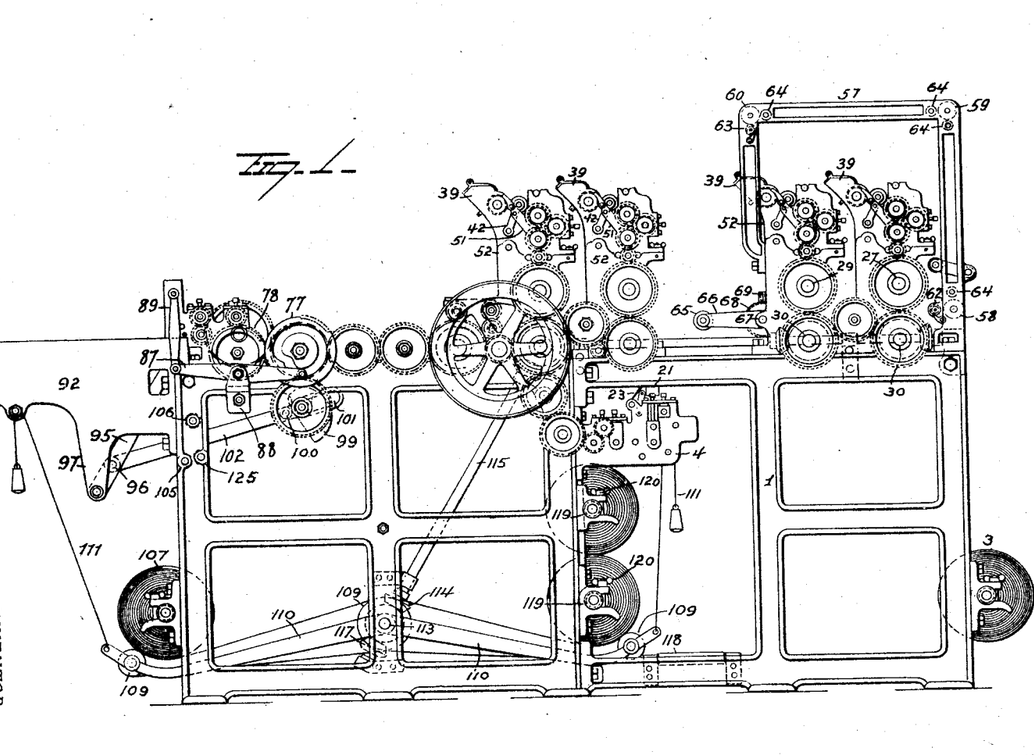
Figure 1 is a view in side elevation illustrating my improvements.
Figure 2:
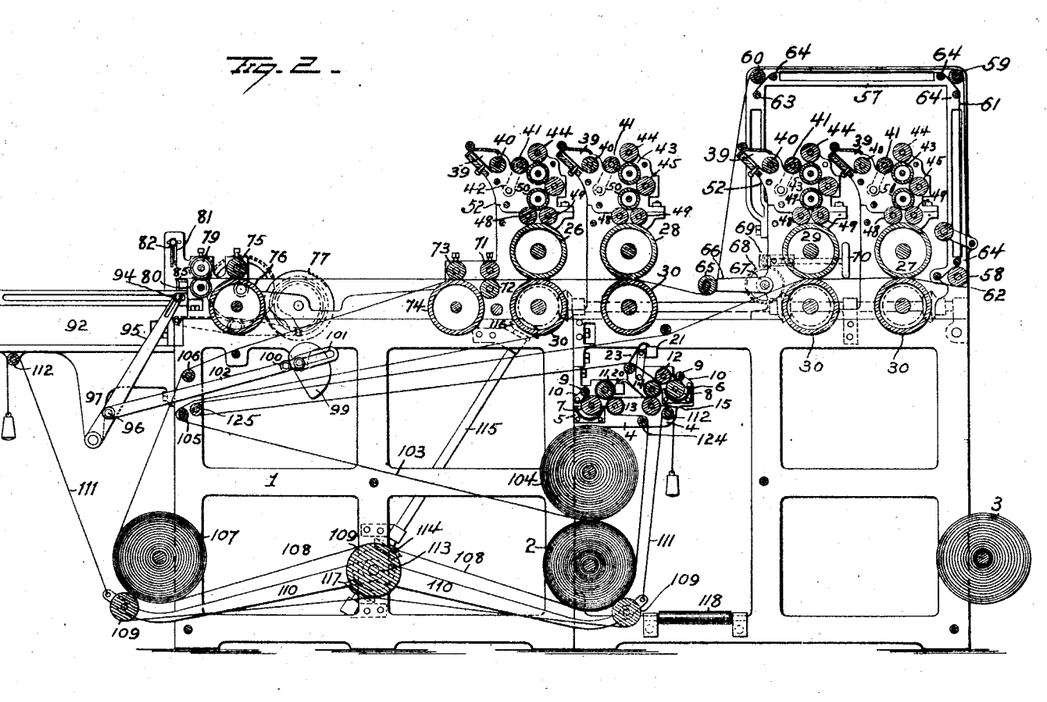
Fig. 2 is a view in longitudinal section.
Figure 4:
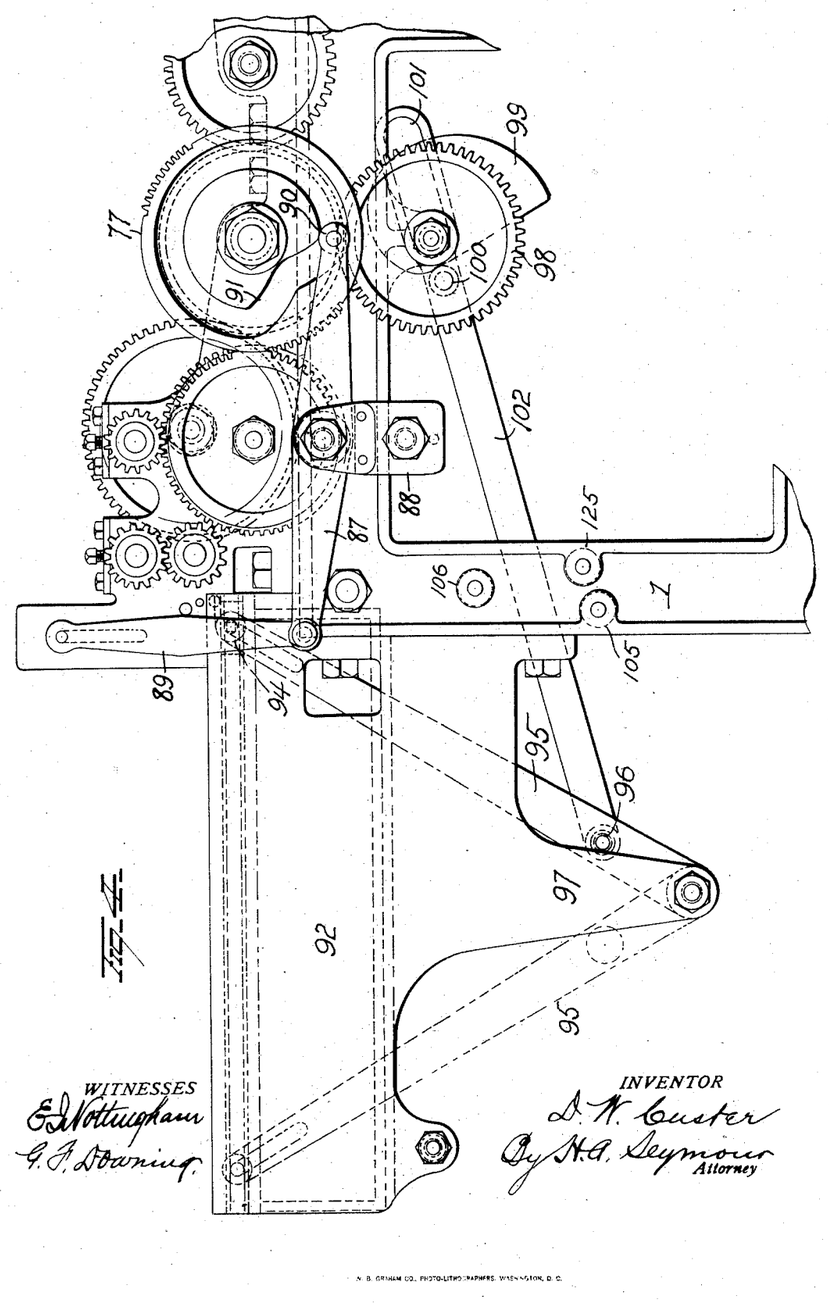
Fig. 4 is an enlarged view of the cutting mechanism and sheet piling mechanism.
Figure 5:
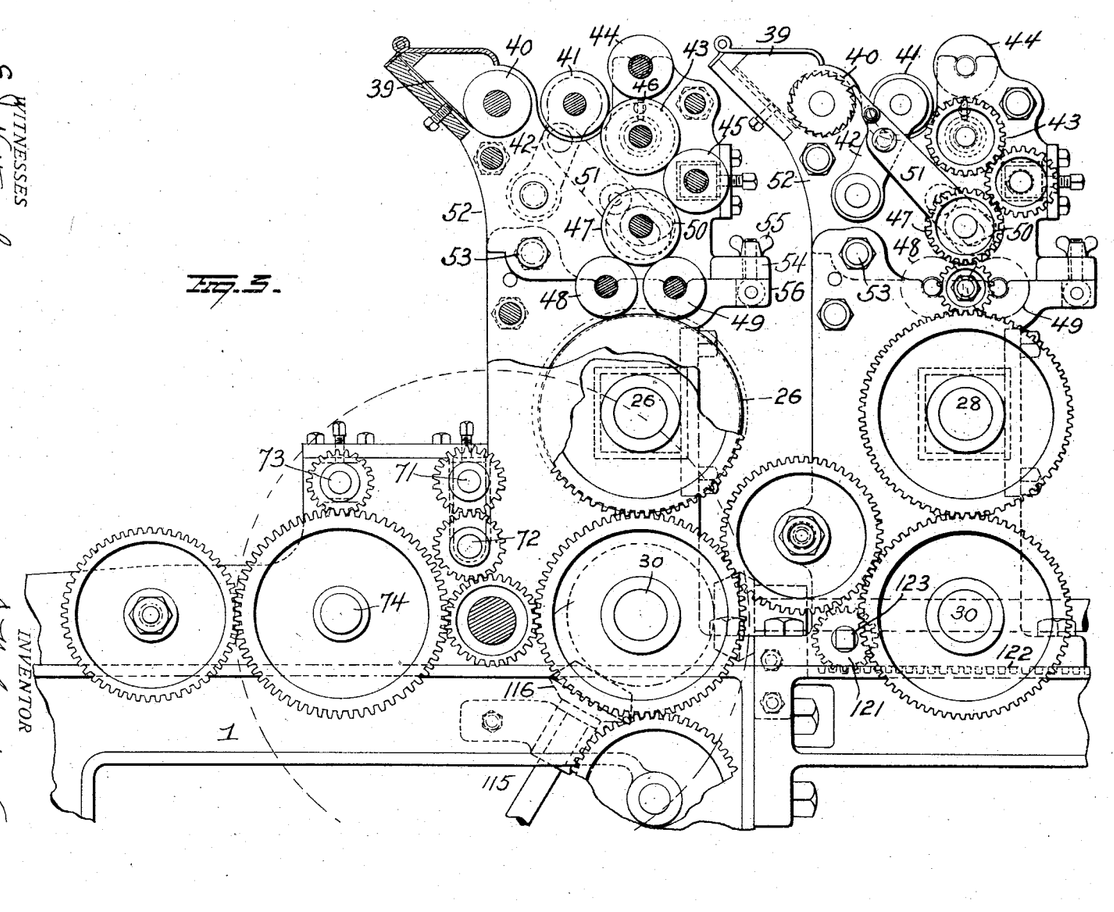
Fig. 5 is a view in section thereof.
Figures 5, 6, 7, 8:
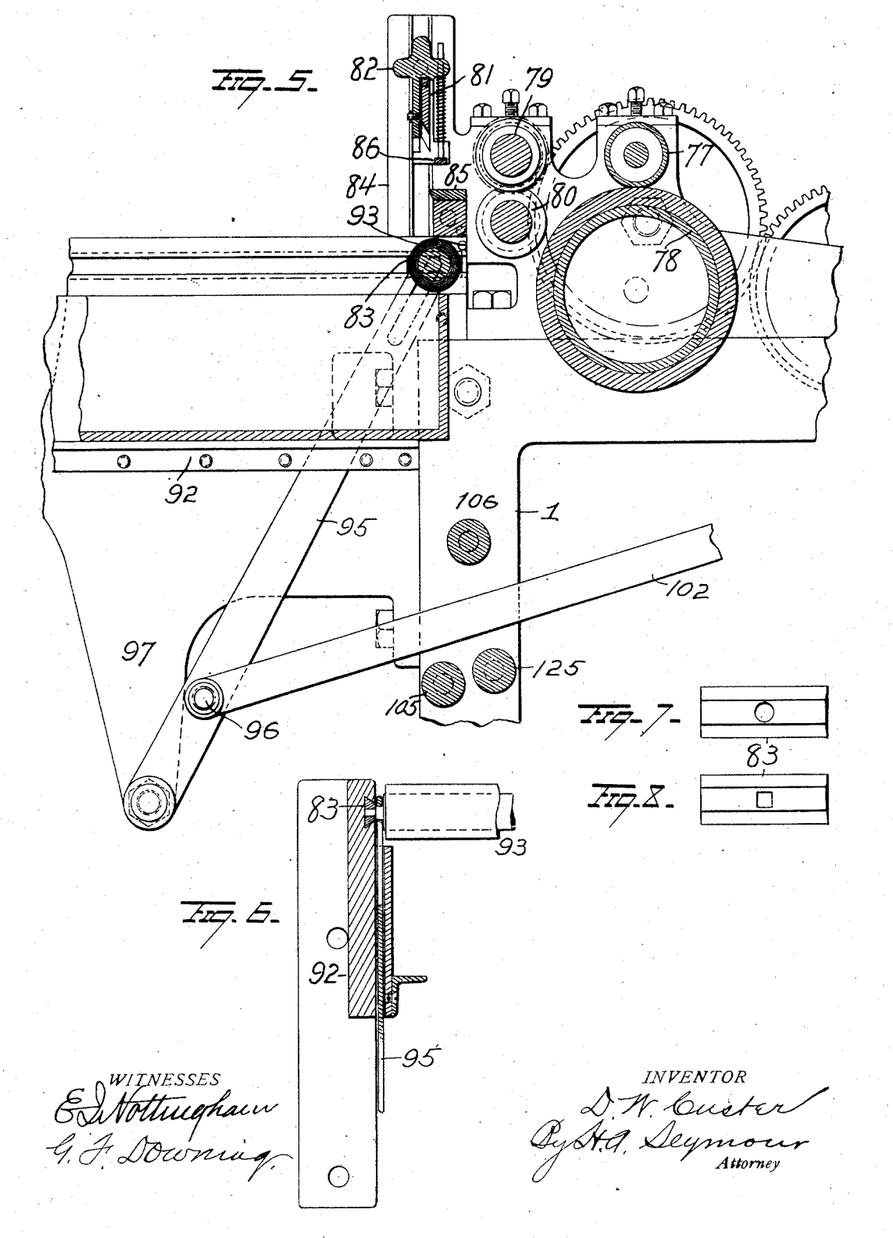
Figs. 6, 7, 8, 9, 10, 11, 12, 13 and 14 are detail views of the cutting mechanism.
Figure 9:
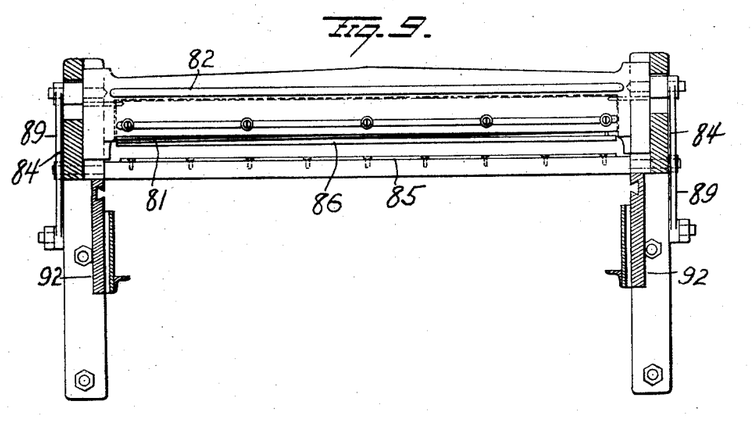
Figures 10, 11, 12:
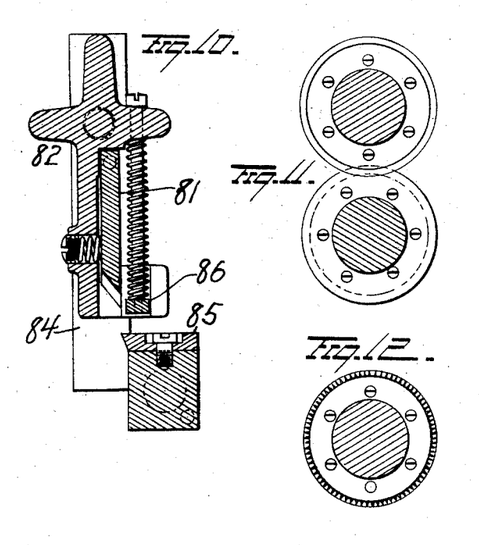
Figure 13:
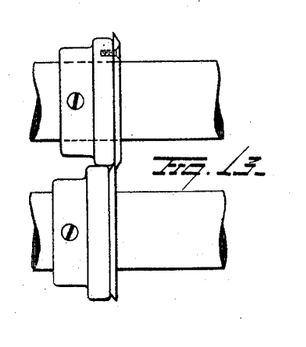
Figure 14:
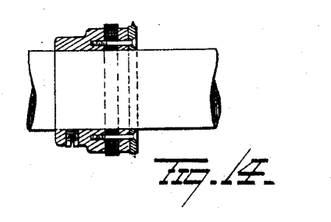
Figure 15:
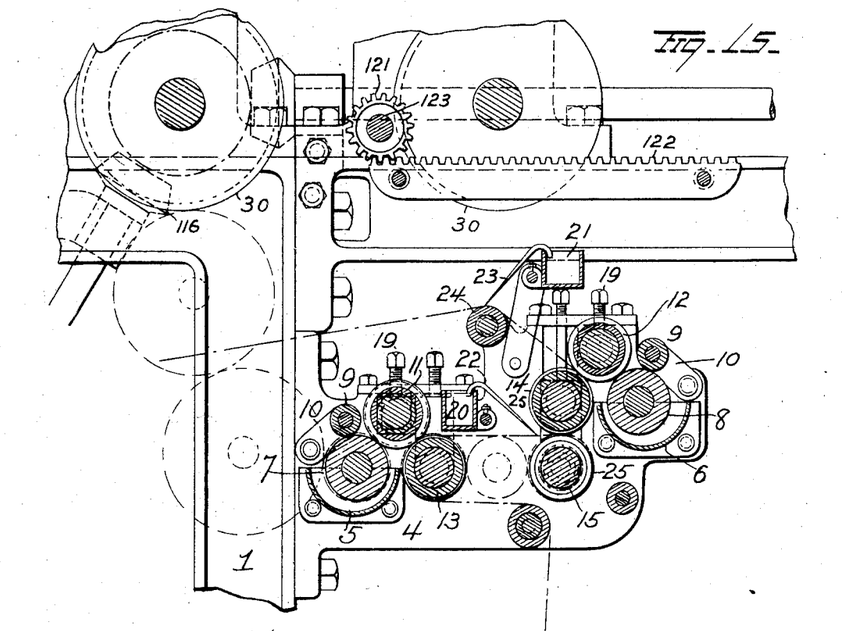
Fig. 15 is an enlarged view in section illustrating the mechanism for longitudinally ruling the strip.
Figure 16:
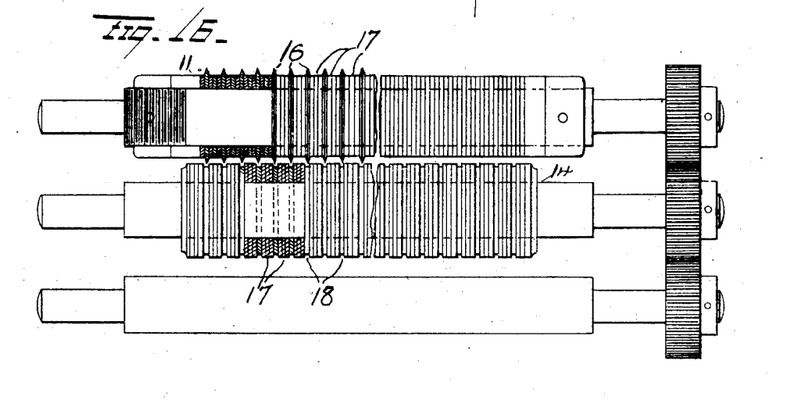
Fig. 16 is an enlarged view of the ruling rolls.
Figure 17:
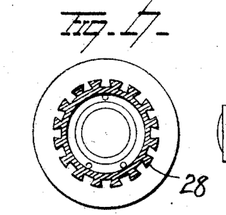
Figs. 17, 18, 19, 20, 21, 22, 23, 24, 25 and 26 are enlarged detail views of other rolls or cylinders of the machine.
Figure 18:
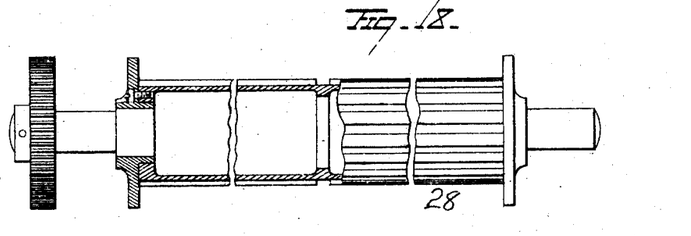
Figure 19:
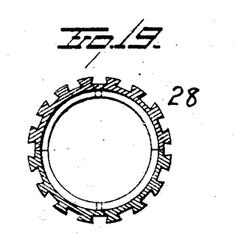
Figure 20:
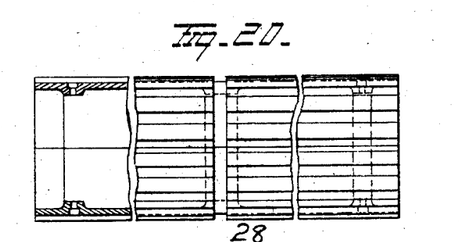
Figure 21:
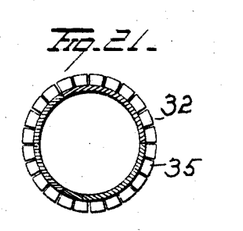
Figure 22:
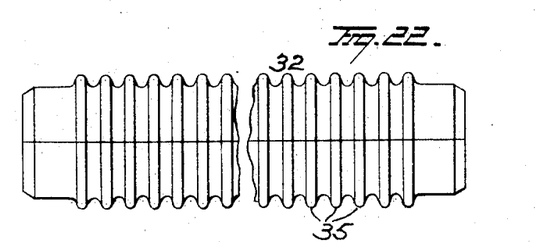

1 represents the main frame of the machine, having rotary supports for paper supply rolls 2 and 3 from either of which the paper strip can be drawn according to the work to be done, but as roll 2 is the one from which the paper is drawn in carrying out the maximum operation of the machine, we will assume this to be the supply roll in the present instance. A frame or brackets 4 are secured to main frame 1, and supports the mechanism for longitudinally ruling the sheet and trimming the edges of the strip, as shown most clearly in Fig. 15.

5 and 6 represent ink reservoirs from which the ink is fed by rolls 7 and 8 respectively and rods or rollers 9 supported on pivoted links 10 rest on the rolls 7 and 8 to restrict the feed of ink and more evenly distribute the ink over the rolls.

11 and 12 are ruling cylinders, 13, 14 and 15 platen cylinders and 14 and 15 are also trimming cylinders, as will now be explained in detail. Each ruling cylinder 11 and 12, comprises a shaft, on which ruling disks 16 are located and spaced apart by spacing disks 17. These ruling and spacing disks are arranged on the point system and hence any number of spacing disks may be located between the ruling disks according to the space desired between the lines. These ruling disks 16 touch the inking rolls to receive the ink therefrom and deposit on the sheet and as they rule on opposite sides of the sheet, the platen roll 14 which will receive the freshly ruled side of the sheet thereagainst, is made with smaller disks 18 between its spacing disks 17 and these smaller disks 18 provide a series of annual grooves around the roll to permit the freshly ruled portion of the sheet to pass over the roll without contact therewith. The ruling rolls 11 and 12 may be adjusted vertically by set screws 19 to adjust the pressure on the sheet.

20 and 21 represent liquid ink reservoirs and 22 and 23 are pens fed by wicks in the reservoirs and engaging opposite sides of the sheet to longitudinally rule the sheet in a color different from the lines made by the rolls 7 and 8 which is very desirable in ruling ledgers, sheets, bills, and the like, and 24 indicates a shaft or roll for guiding the strip of paper beneath and in contact with the pens 23. The rolls 14 and 15 near their ends are provided with cutting disks 25 which serve to trim the edges of the strip straight and smooth.

Figure 23:
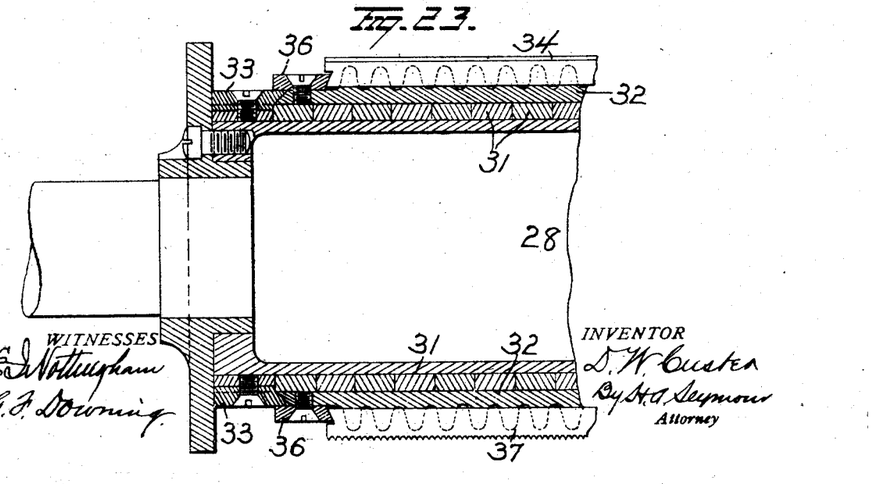
Figure 24:
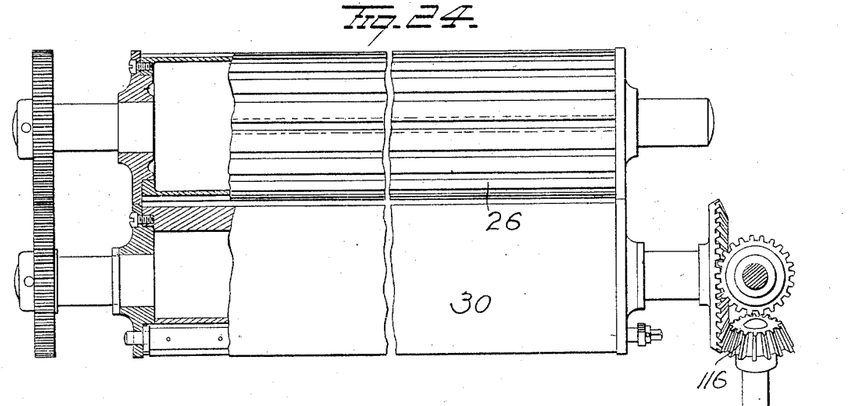
Figure 25:
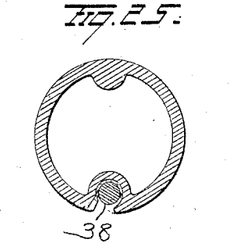
Figure 26:
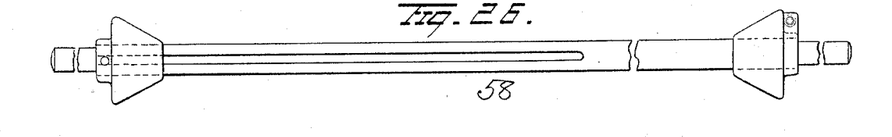

26 and 27 represent printing cylinders, and 28 and 29 are vertical ruling, perforating and numbering cylinders, and platen cylinders 30 are located below all of the said cylinders. All of said cylinders 26, 27, 28 and 29 have a longitudinally grooved shell, the grooves in the printing cylinders 26 and 27 to receive the printing plates secured thereto, and the ruling cylinders 28 and 29 are shown in section in Fig. 23, in which it will be seen the grooves are filled by blocks 31 and a segmental shell 32 is clamped on the cylinder shell by beveled clamps 33. The shell 32 is longitudinally grooved to receive rules 34 and is made with annular webs or enlargements 35 which form braces for the rules. The rules 34 are notched at their ends and clamps 36 firmly secure them in the grooves of the shell 32. Perforators 37 may also be secured to the cylinder as shown in this Fig. 23, and numbering heads may be provided if desired. The platen rolls or cylinders 30 are made with longitudinal grooves to receive rods 38 on which tympan sheets are secured, and the sheets can be adjusted on the rods 38 or removed and replaced at will. All of the cylinders or rolls 26, 27, 28 and 29 are provided with independent inking mechanism, and as all of the inking mechanisms are alike the description of one inking mechanism will apply alike to all.

39 is the ink reservoir having a fountain roll 40, with which a transfer roll 41, supported in swinging links 42, makes contact and deposits the ink on distributer roll 43 making contact with composition rolls 44 and 45. This distributer roll 43 is provided at one end with a wheel having a cam groove in its periphery, into which a pin 46 on the frame projects, and hence as the roll revolves it will be reciprocated to perfectly distribute the ink. A distributing roll 47 takes the ink from roll 45 and transfers it to rolls 48 and 49 and the latter contact with the printing and ruling cylinders to ink them. A cam 50 on roll shaft 47 reciprocates a link 51 connected with one of the links 42 to swing the transfer roll 41 against and away from the fountain roll 40.

All of the rolls and ink reservoir above described, with the exception of rolls 48 and 49 are mounted in a frame 52 pivotally secured to the machine frame by a rod or bolt 53 and eye bolts 54 and nuts 55 clamp lugs 56 on the frame 52 to secure it to the machine frame, but whenever desired, this frame 52 can be swung back to give ready access to the printing and ruling cylinders, which is of great importance in a machine of this character, causing the ink to be thoroughly distributed throughout the inking rolls before the paper is fed through.

A framework 57 supports rolls 58, 59 and 60 for carrying the paper strip up and over the inking mechanisms for rolls 27 and 28, and a wiper sheet 61 winds from a shaft 62 onto a shaft 63, and is held against the rolls 58, 59, and 60 by rods 64 to wipe the ink from said rolls and prevent smearing of the paper, and ratchet means is provided on one or both of the shafts 62 and 63 to move the sheet and expose clean sections thereof to the rolls. The strip of paper after leaving roll 60 passes under a roll 65 supported in arms 66 to hold the sheet below the feed line between the rolls 26 and 30 and the arms 66 are secured on a shaft 67 having a worm wheel 68 at its end, with which a worm-gear 69 on an adjusting shaft 70 meshes, to permit the arms to be adjusted up and down to adjust the position of roll 65. After passing between rolls 29 and 30 the strip of paper passes between rolls 71 and 72 and thence between feed rolls 73 and 74. The roll 73 comprises a shaft carrying a series of rubber covered rolls which are adjustable to any position desired on the shaft, and rubber rings on said roll and which can be controlled to regulate the feed of paper. The paper then passes between rolls 75 and 76 similar to rolls 73 and 74 but these latter rolls are stopped at regular intervals to allow the cutting mechanism to intermittently act, as will now be explained. A segmental gear 77, driven by the chain of gearing driving the several rolls of the machine, meshes with a segmental gear on the shaft of roll 76 and when the gears 77 and 78 reach that position of their peripheries where no teeth are provided gear 78 will be held long enough to allow the cutter to act with the strip held stationary and will then begin to feed and take up the slack in the strip between the pairs of feed rolls. After leaving the rolls 75 and 76 the strip passes between cutters 79 and 80 which latter have disk cutters located thereon and adjustable to any point desired, and adapted to cut the strip into any number of strips of the widths desired, and the paper then passes below the vertically movable reciprocating cutter 81, clearly shown in Figs. 4 to 10 inclusive.

The cutter or blade 81 is supported by a frame 82 having guides 83 at its ends movable in grooved uprights 84 on the frame and moving the cutter against a stationary cutting blade 85 to sever the sheets, and the frame 82 carries a spring-pressed bar 86 which engages and holds the paper stationary as it is being cut. The cutter is moved up and down by a lever 87 pivoted between its ends in a bracket 88 and connected, at one end, by a link 89 with the cutter frame 82. The other end of the lever 87 carries a roller 90 mounted in a cam groove 91 in gear 77 and is oscillated thereby to bring the cutter down at the proper time.

At the rear end of the machine a box 92 is provided to receive the cut sheets, which are deposited therein by my improved apron 93. The apron 93 is secured at its end to the frame near the cutter and at its other, or outer end, is secured to a spring roller 94 carried by links 95 in slots in the box and in the ends of the links and said links secured together by a cross rod 96 and pivotally secured at their lower ends to depending arms 97 on box 92. A continuously turning gear 98 revolves a cam or eccentric 99 and the latter has a stud 100 located in a slot 101 in a bar 102 connected to the cross rod 96, so that as the bar 102 is moved by the cam 99, the links 95 will be swung to carry the apron out as the sheets feed forward, and after the sheets are cut, the links will be carried back and the apron 93 will wind up on roller 94 and deposit the cut sheets in the box.

To protect the tympan sheets of the platen cylinders I provide a slip or smut sheet 103 which is fed from a roll 104 over shaft 105, above the platen cylinders, over shaft 106 and onto roll 107. These rolls 104 and 107 are turned at proper speed by belts 108 passed around pulleys 109 at the ends of pivoted arms 110 and held against the rolls by weighted cords 111 secured to the ends of arms 110 and passed over pulleys 112 on the frame. The pulleys 109 at the inner pivotal ends of arms 110 are secured on a shaft 113 having a beveled gear at one end, driven by a beveled pinion 114 on a shaft 115 which latter carries a beveled pinion 116 at its opposite end, driven by a beveled gear on the shaft of platen cylinder 30 below printing cylinder 28. The shaft 115 also carries, at its lower end a pinion 117 which when secured to the shaft will turn the pulleys and belts in an opposite direction to that described, or the positions of the rolls can be reversed after the sheet has run through. Skid rollers 118 are located in the base of the frame which permits the heavy paper rolls to be moved into position, from which the shafts supporting them can be lifted into their bearings 119 and secured by the hinged bolts 120, as clearly shown. The frame supporting the cylinder 28, platen 30 therefor and the inking mechanism for this cylinder, is supported by pinions 121 on racks 122, and the pinions 121 are secured on a shaft 123, which can be turned to move the frame forward and give ready access to the printing cylinder 26 and coöperating parts.

A maximum operation of my improvements is as follows:—The strip of paper from roll 2, passes up over a shaft 124, thence around roll 13 with ruling roll 11 thereagainst to rule the strip longitudinally in one color. The strip then passes beneath pens 22 which rule the paper on the same side in a different color and the strip is then trimmed by the cutters on rolls 14 and 15 and the strip passes around roll 14 and receives the ruling by roll 12 on the side opposite to that ruled by roll 11 and pens 22. The paper next passes over roll 24 where it is ruled by pens 23 in a color different from that of the lines made by the disk roll 12 but on the same side. The strip of paper is then ruled longitudinally on both sides in two or more colors, and is carried to the rear of the machine, around shaft 125 and thence again forward to and between cylinder 29 and its platen cylinder 30. This long path of movement, gives the ruling time to dry before reaching cylinder 29 where it receives the cross ruling on one side and then receives the printing on this side from cylinder 29. The strip then passes over rolls 58, 59 and 60 and down below roll 65, and thence below cylinder 28 where it is cross ruled on the other side and perforated if desired. It next passes below cylinder 26 to receive the printing on this side and is fed by rollers 73, 74 and 75, 76, as above explained to the cutting disks on rolls 79 and 80 to sever the strip into narrower strips of the desired width. The strips are then cut by the cutter 81 into the desired lengths, and taken from the cutter by apron 93 and deposited in box 92 by the mechanism above pointed out.

Practically any of the above principal mechanisms may be cut out of operation and the strip may be passed through the machine in a great variety of ways to perform the work desired, and it is therefore unnecessary for me to set forth all the different manipulations of the paper strip as that will be apparent.

A great many changes might be made in the general form and arrangement of the parts described without departing from my invention, and hence I do not restrict myself to the precise details set forth but consider myself at liberty to make such slight changes and alterations as fairly fall within the spirit and scope of my invention.

Having fully described my invention what I claim as new and desire to secure by Letters-Patent, is:—

In a machine of the character described, the combination with feeding means, of printing means operative successively to print on both sides of a sheet, means operative successively to rule the sheet longitudinally in different colors on one side of the sheet, similar ruling means operative successively to rule the other side of the sheet in different colors, two ruling means for ruling the sheet transversely on respective sides thereof, and severing means.

In testimony whereof I have signed this specification in the presence of two subscribing witnesses.

DWIGHT W. CUSTER.

Witnesses:
 JOHN D. HAYES,
 F. EICHE.